United States Patent [19]
Quandt

[11] Patent Number: 5,761,877
[45] Date of Patent: Jun. 9, 1998

[54] SYSTEM FOR INDIVIDUAL DOSAGE MEDICATION DISTRIBUTION

[76] Inventor: W. Gerald Quandt, 13102 Sycamore Heights, Houston, Tex. 77065

[21] Appl. No.: 800,998

[22] Filed: Feb. 20, 1997

Related U.S. Application Data

[60] Provisional application No. 60/012,195 Feb. 23, 1996.

[51] Int. Cl.$^6$ .................................................. B65B 35/54
[52] U.S. Cl. ........................... 53/155; 53/154; 53/168; 53/52; 53/54; 53/493; 53/131.4; 53/131.5; 53/237; 53/238; 53/284.7; 53/570; 221/9; 221/92; 221/124; 221/129
[58] Field of Search .................. 53/154, 155, 168, 53/202, 52, 54, 131.2, 131.3, 131.4, 131.5, 237, 238, 284.7, 493, 550, 570; 221/2, 7, 8, 9, 10, 92, 93, 94, 95, 123, 124, 129; 364/478.03, 478.04, 478.13, 478.14, 478.15, 479.01, 479.05, 479.11, 479.12, 479.13

[56] References Cited

U.S. PATENT DOCUMENTS

| | | | |
|---|---|---|---|
| 3,803,556 | 4/1974 | Duffy | 364/478.14 |
| 3,871,156 | 3/1975 | Koenig et al. | 53/168 X |
| 4,501,528 | 2/1985 | Knapp | 221/93 X |
| 4,546,901 | 10/1985 | Buttarazzi | 221/10 |
| 4,655,026 | 4/1987 | Wigoda | 53/131.3 X |
| 4,733,362 | 3/1988 | Haraguchi | 361/479.05 |
| 4,811,764 | 3/1989 | McLaughlin . | |
| 4,847,764 | 7/1989 | Halvorson . | |
| 4,870,799 | 10/1989 | Bergerioux et al. | 53/168 X |
| 4,972,657 | 11/1990 | McKee | 53/168 X |
| 5,097,652 | 3/1992 | Ihamura et al. | 53/168 X |
| 5,097,982 | 3/1992 | Kedem et al. . | |
| 5,208,762 | 5/1993 | Charhut et al. | 53/493 X |
| 5,337,919 | 8/1994 | Spaulding et al. | 221/2 |

FOREIGN PATENT DOCUMENTS

| | | |
|---|---|---|
| 0 208 029 A1 | 1/1987 | European Pat. Off. . |
| 0 439 355 A2 | 7/1991 | European Pat. Off. . |
| WO 92/10985 | 7/1992 | WIPO . |

OTHER PUBLICATIONS

Baxter Healthcare Corporation, Sales brochure—"ATC™ 212 System Automated Medication Dispensing System," all pages, 1991.
Argus, Sales brochure—"Argus An Automated Medication Management System For Hospitals" all pages, 7 Dec. 1992.
Baxter Healthcare Corporation, Sales brochure—"ATC™ Profile Automated Medication Dispensing System," all pages, 1995.
Automated Healthcare, Inc., Sales brochure—"Automated Pharmacy Station," all pages, exact date unknown.
Baxter Healthcare Corporation, Sales brochure—"ATC™ Profile Automated Medication Dispensing System," all pages, 1996.

*Primary Examiner*—Daniel Moon
*Attorney, Agent, or Firm*—Timothy M. Honeycutt

[57] ABSTRACT

An automated system for individual dosage medication distribution 10 is provided. The system 10 includes a medium rate dispenser 20, a fast rate dispenser 30, a low rate dispenser 40, a conveyor 50, a diverter 60, a bagger 70, and collection bins 80 and 85. The dispensers 20, 30, and 40 are arranged to be able to deliver individual dosage packages of drugs to the conveyor 50. The conveyor 50, in turn, is configured to transport individual dosage packages to the bagger 70 or the collection bin 85. A programmable controller 12 receives patient prescription order information from health care providers and directs the dispensers 20, 30, and 40, conveyor 50, diverter 60, and bagger 70 to automatically pick the prescribed medication dosage unit, place it in a transportable package, and label the package for the health care personnel.

7 Claims, 3 Drawing Sheets

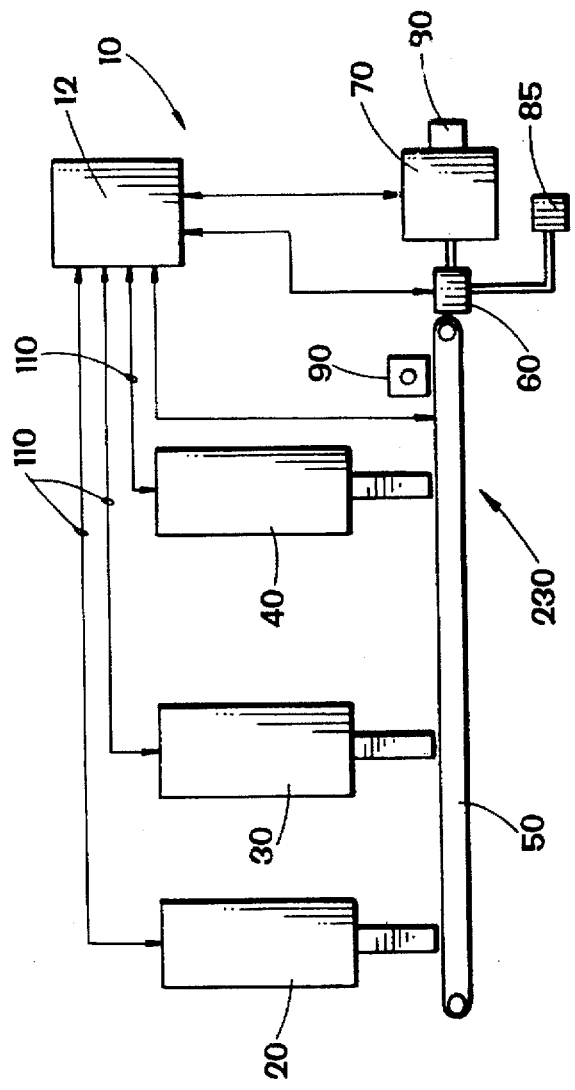
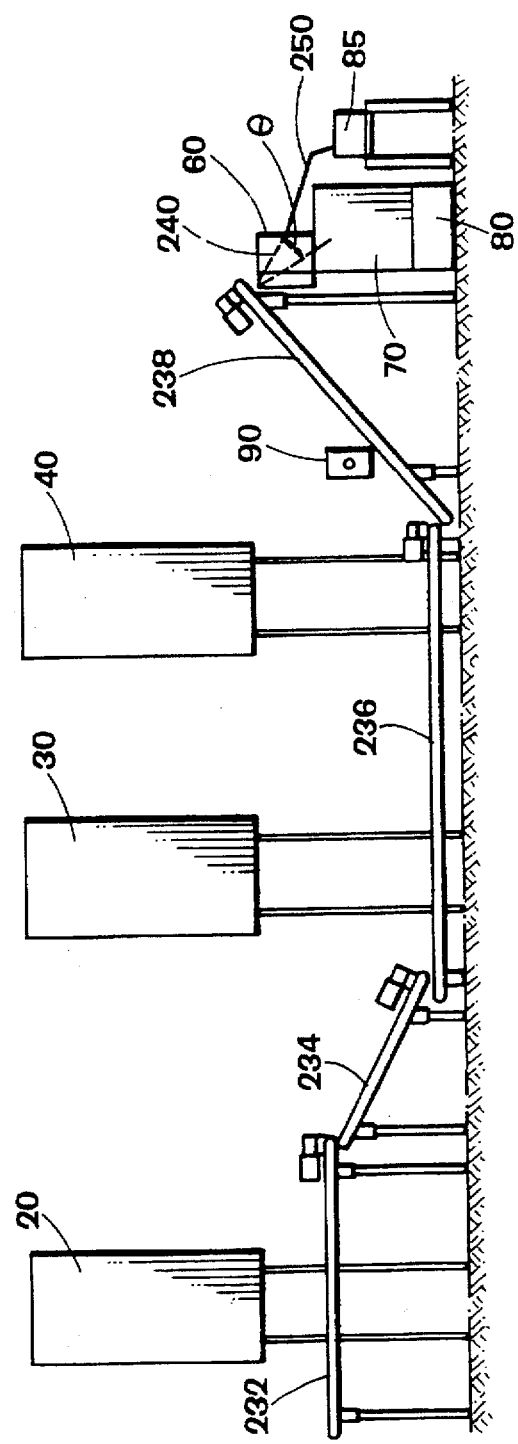
FIG. 1
FIG. 5

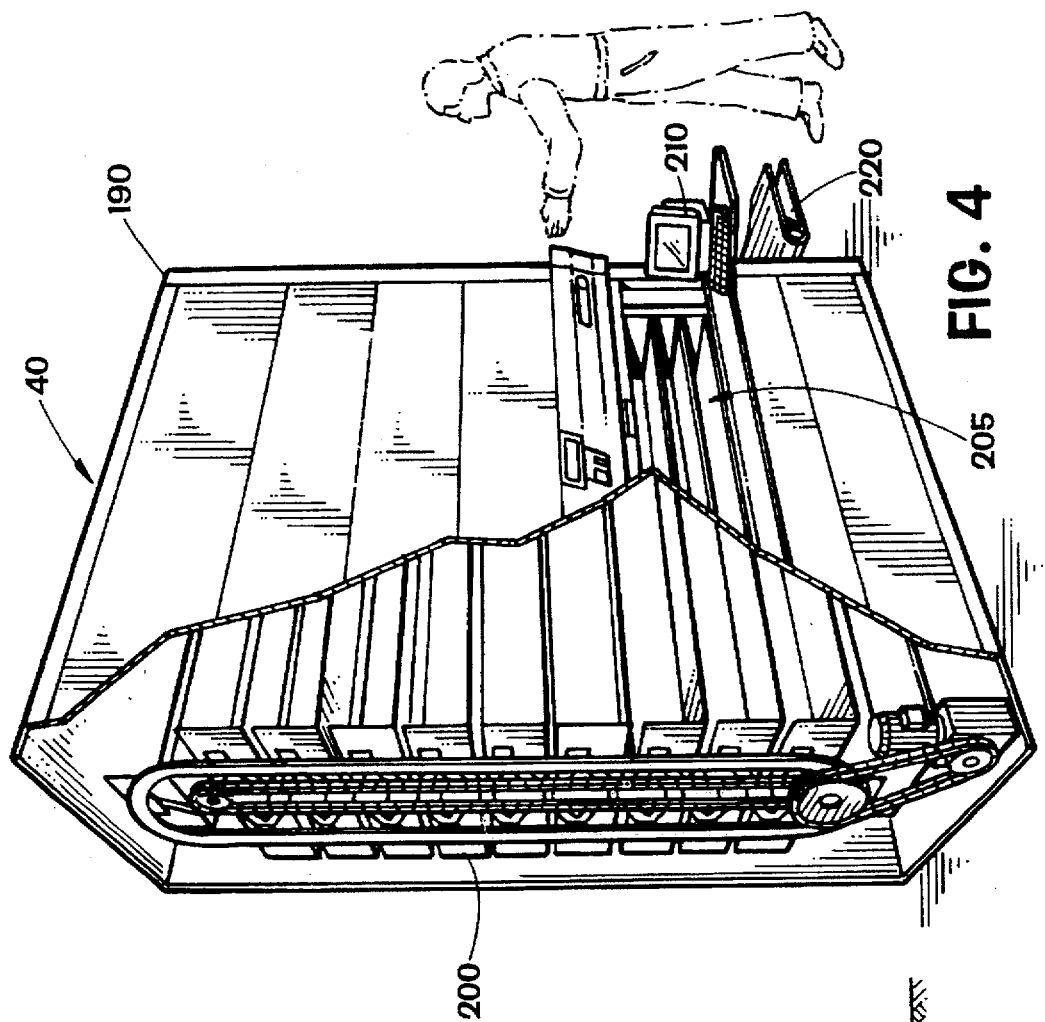
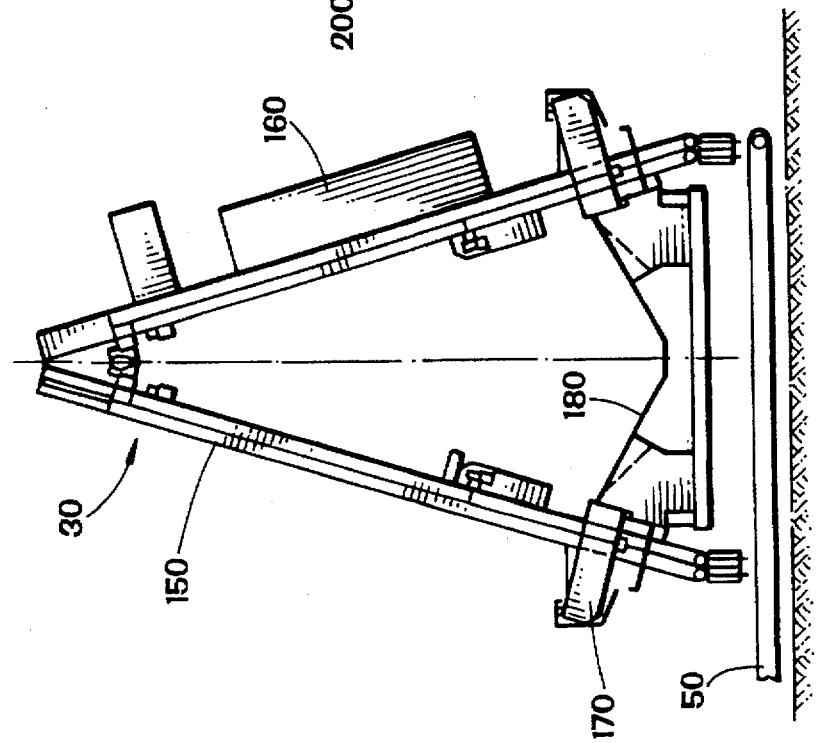

SYSTEM FOR INDIVIDUAL DOSAGE MEDICATION DISTRIBUTION

This is a continuation of Provisional Application 60/012,195 filed Feb. 23, 1996, now abandoned.

BACKGROUND OF THE INVENTION

1. Field of the Invention

This invention relates generally to systems for distributing pharmaceutical products and, more particularly, to systems for distributing pharmaceutical products that utilize one or more automated dispensers and bagging machines.

2. Description of the Related Art

Hospitals and other health care facilities distribute and administer medications to patients in individual doses numerous times per day. These pharmaceutical products are generally packaged by the manufacturers in "unit of use" or "unit dose" packages and are stored in cartons of ten to one hundred units in health care facilities' pharmacies. The traditional method for distributing individual dosage units of medication to patients begins with the generation of a patient order by a physician for a particular medication. The patient order is then delivered to the pharmacy. There, the process of interpreting the patient order, pulling the specified medication from the drug storage areas, packaging the medication, and labeling the package is routinely done manually by pharmacy support personnel. After a final check by the facility pharmacist, the packaged individual dosage units are ready for distribution to the nursing unit where a nurse will administer them to the patient.

There are several disadvantages associated with the traditional method of distributing individual dosage units of medication. To begin with, the process is labor and cost intensive. Many separate physical movements are required to fill a single patient order. In large facilities servicing hundreds of patients each day, the staffing requirements to rapidly process patient orders may be substantial. In addition, with so many human inputs required for the existing process, there is also risk of human error.

The present invention is directed to alleviating or reducing one or more of the foregoing disadvantages.

In accordance with one aspect of the present invention, an apparatus for distributing individual dosage units of medication into containers is provided. The apparatus includes a first dispenser that has a first plurality of shelves for holding the individual dosage units of medication, and a robotic picking unit that has at least two-axis movement for selectively picking one of the individual dosage units of medication off of one of the first plurality of shelves and dropping the picked individual dosage unit of medication. A second dispenser is provided that has an A-frame, a plurality of storage cells coupled to the A-frame for holding the individual dosage units of medication wherein each of the plurality of storage cells is motorized and operable to individually dispense the individual dosage units of medication. A dedicated controller unit is coupled to the A-frame for controlling the operation of the plurality of storage cells. A first conveyor is provided for receiving the dispensed individual dosage units of medication. The second dispenser is operable to dispense the individual dosage units of medication at a faster rate than the first dispenser. There is a second conveyor for conveying the individual dosage units of medication dropped by the first dispenser and conveyed by the first conveyor. A bagger is provided that is operable to receive the individual dosage units of medication from the second conveyor and to selectively place the individual dosage units of medication into the containers. A programmable controller is electrically coupled to the first and second dispensers, the bagger, and the dedicated controller and is operable to direct the first and second dispensers to dispense the individual dosage units of medication and to direct the bagger to place the individual dosage units of medication into the containers.

In accordance with another aspect of the present invention, an apparatus for distributing individual dosage units of medication into containers is provided. The apparatus includes a first dispenser that has a first plurality of shelves for holding the individual dosage units of medication, and a robotic picking unit that has at least two-axis movement for selectively picking one of the individual dosage units of medication off of one of the first plurality of shelves and dropping the picked individual dosage unit of medication. A second dispenser is provided that has an A-frame and a plurality of storage cells coupled to the A-frame for holding the individual dosage units of medication wherein each of the plurality of storage cells is motorized and operable to individually dispense the individual dosage units of medication. A dedicated controller unit is coupled to the A-frame for controlling the operation of the plurality of storage cells. A first conveyor is provided for receiving the dispensed individual dosage units of medication. The second dispenser is operable to dispense the individual dosage units of medication at a faster rate than the first dispenser. A second conveyor is provided for conveying the individual dosage units of medication dropped by the first dispenser and conveyed by the first conveyor. The second conveyor includes third, fourth, fifth, and sixth continuous running conveyors. A bagger is provided that is operable to receive the individual dosage units of medication from the second conveyor and to selectively place the individual dosage units of medication into the containers. A storage bin is provided to receive the individual dosage units of medication from the second conveyor. A diverter is included that has a pivotable plate to selectively divert the individual dosage units of medication to either the bagger or the storage bin. A personal computer is electrically coupled to the first and second dispensers, the bagger, the dedicated controller, and the diverter, and is operable to direct the first and second dispensers to dispense the individual dosage units of medication, the diverter to divert the individual dosage units of medication to either the storage bin or the bagger, and to direct the bagger to place the individual dosage units of medication into the containers.

BRIEF DESCRIPTION OF THE DRAWINGS

The foregoing and other advantages of the invention will become apparent upon reading the following detailed description and upon reference to the drawings in which:

FIG. 1 is a block diagram of an exemplary embodiment of a system for individual dosage medication distribution in accordance with the present invention;

FIG. 3 is a detailed drawing of an exemplary embodiment of a high rate dispenser in accordance with the present invention;

FIG. 4 is a detailed drawing of an exemplary embodiment of a low rate dispenser in accordance with the present invention;

FIG. 5 is pictorial schematic view of an exemplary embodiment of a conveyor system in accordance with the present invention.

DETAILED DESCRIPTION OF SPECIFIC EMBODIMENTS

Figure 6:
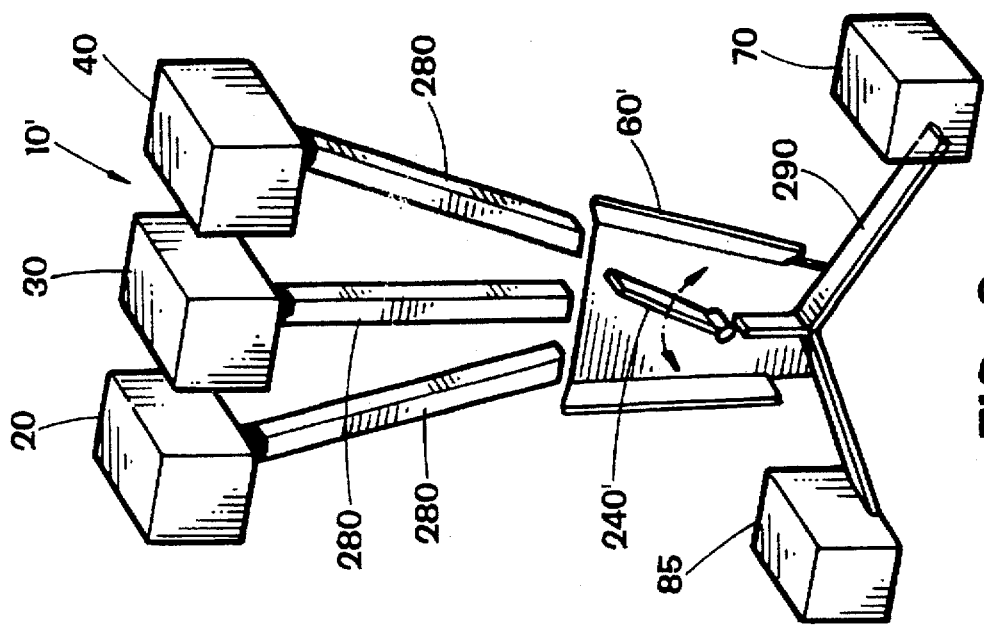
FIG. 6 is a pictorial schematic view of an alternate exemplary embodiment of a system for individual dosage medication distribution in accordance with the present invention.

It should be understood that the following discussion is made with reference to exemplary embodiments. Turning now to the drawings, and referring initially to FIG. 1, a system for individual dosage medication distribution 10 (hereinafter referred to as "system 10") is depicted. The system 10 includes a programmable controller 12, a medium rate dispenser 20, a high rate dispenser 30, a low rate dispenser 40, a conveyor 50, a diverter 60, a bagger 70 and collection bins 80 and 85. The system 10 may also include an optical scanner 90 as shown. The dispensers 20, 30, and 40 are arranged to be able to deliver individual dosage packages of drugs to the conveyor 50. The conveyor 50, in turn, is configured to transport individual dosage packages to the bagger 70 and storage bin 80 or to the storage bin 85. The programmable controller 12 is electrically coupled to the dispensers 20, 30, and 40, conveyor 50, diverter 60, bagger 70, and optical scanner 90 via a plurality of lines 110. The lines 110 may be hard-wire lines, telephone communication lines via modems, RF signal lines or any other form of communication line which conveys commands, data, etc.

The terms "high rate", "low rate", etc. used to describe the dispensers 20, 30, and 40 does not connote any particular drug feed rate. Rather, the terms refer to the relative rates at which the dispensers 20, 30, and 40 deliver dosage units of medication to the conveyor 50. In other words, the high rate dispenser 30 has a higher feed rate than the medium rate dispenser 20, and the medium rate dispenser 20 has a higher feed rate than the low rate dispenser 40.

Referring still to FIG. 1, the controller 12 is designed to control the movements of the various components in the system 10 in response to input from an on-site operator or from central prescription or medication order databases in the particular facility where it is located, from doctor's offices in surrounding areas or from any other health care entity that has access to the controller 12. Information pertaining to prescriptions or medication orders may be received by the controller 12. Once information is received, the controller 12 determines which of the dispensers 20, 30, or 40 contain the requested medications by reviewing the inventories of items stored in each dispenser 20, 30, and 40. After determining the location of the desired dosage items, the controller 12 generates signals to activate any or all of the dispensers 20, 30, or 40, as the case may be. As dosage units of medication are depleted from the dispensers 20, 30, and 40, the controller 12 tracks the changes in inventory levels so that personnel may resupply as necessary.

The controller 12 may be provided in a variety of different designs. For example, a personal computer may be easily coupled to the system and provide the necessary computational and control capability. Alternatively, a dedicated programmable controller may be utilized. The skilled artisan will appreciate that the code necessary to implement the various control and data acquisition functions of the controller 12 will depend largely on the particular platform chosen for the controller 12. In the case of a computer, the code will be preferably software based. However, if a more dedicated device is used, firmware may be appropriate. In a preferred embodiment, a personal computer is used in conjunction with a software program developed by Morris & Dickson in Shreveport, La.

Figure 2:
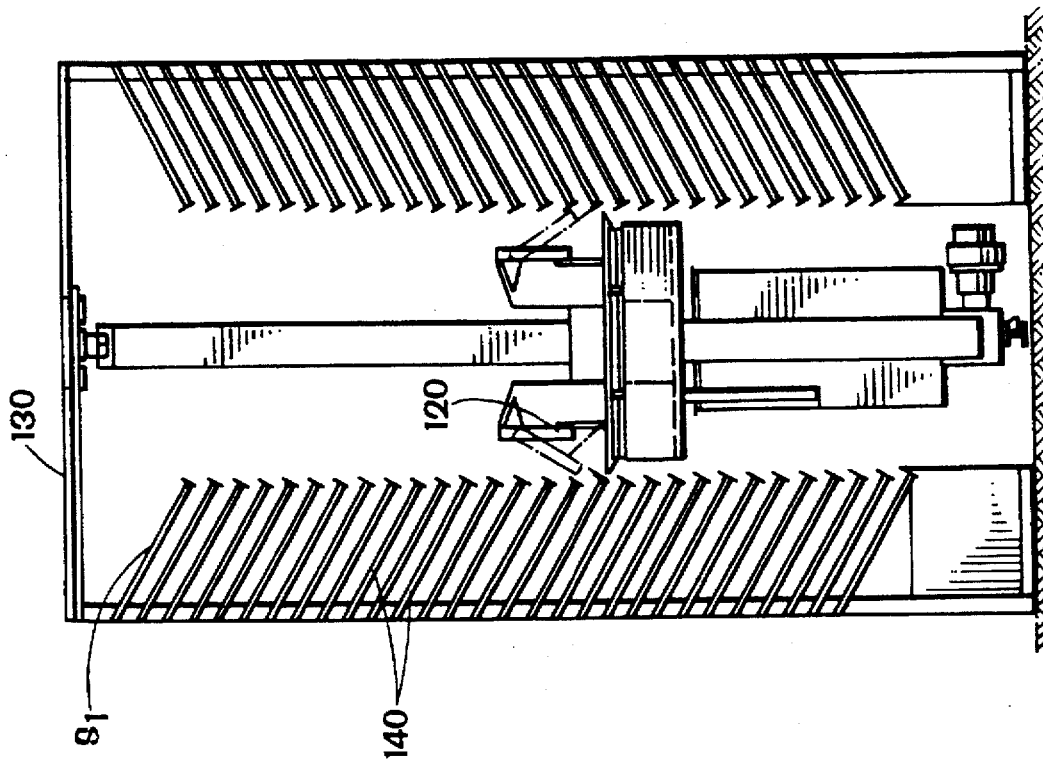
FIG. 2 is a detailed drawing of an exemplary embodiment of a medium rate dispenser in accordance with the present invention.

Referring now also to FIG. 2, the medium rate dispenser 20 includes a robotic picking unit 120 partially enclosed within a housing 130. A plurality of shelves 140 for holding individual dosage packages of medication are disposed within the housing 130. The locations of the particular types and quantities of drugs on the shelves 140 are stored in the controller 12. The picking unit 120 is capable of at least two-axis movement to facilitate access to any of the shelves 140 for acquisition of individual dose packages. Instructions for the acquisition of a given dosage package are received from the controller 12. For example, in response to a care giver's requisition to the controller 12 for a dosage of particular drug for a given patient, the controller 12 may send an instruction directing that one dosage package should be collected from shelf SI, for example, and delivered to the conveyor 50 by the picking unit 120. A preferred medium rate dispenser 20 is manufactured by Automated Healthcare Systems under the specific trade name Automated Pharmacy Station and KHT Produkte im Griff in Gelfin Kirchen, Germany under the specific trade name Picking Robot KOMMS. However, other similar devices may be used as well.

Referring now to FIGS. 1 and 3, the high rate dispenser 30 includes a generally A-frame shaped frame 150. A dedicated controller unit 160 is mounted on the exterior of the frame 150 and is electrically coupled to the controller 12. The high rate dispenser 30 contains a number of storage compartments or cells 170. Individual dosage units packaged as cassette rolls of tablet and capsule medications, magazines of prefilled syringes and channels of unit-of-use cups containing liquids are stored in the cells 170. Tablet and capsules are typically packaged in strips, rolled and placed in cardboard cassettes which are loaded into the cells 170. Each of the cells 170 is motorized and capable of dispensing its contents. As with the medium rate dispenser 20, the locations of the particular types and quantities of drugs in the cells 170 is stored in the controller 12. Upon receipt of instructions from the controller 12, the controller 160 can direct that rolls of products in a given cell 170 be advanced to expose and cut a single tablet or capsule. The package that is cut from the roll falls to a conveyor 180 disposed within the frame 150. The conveyor 180 is configured to feed to the conveyor 50. Signals sent to cells 170 containing syringe and liquid cup dispensers likewise activate a trigger that releases a single unit or multiple units depending on inputs to the controllers 12 and 160. Again, these products fall to the conveyor 180.

In an exemplary operational sequence, an order for a patient calls for one Co-Tylenol 25 mg tablet, one Acetominophen 50 mg/0.5 cc oral syringe and one Digoxin 0.25 mg/5 cc liquid cup. In this circumstance, three individual signals would be sent from the controller 12 to the controller 160. The controller 160 would send a signal to the cell 170 defined for Co-Tylenol 25 mg and the cell 170 would advance the tablet roll one tablet and cut it from the roll. At the same time, a second signal would be sent to the cell 170 for oral syringe magazine defined for Acetominophen 50 mg/0.5 cc and it would activate the release of a single syringe. The third signal would be sent to the cell 170 holding the Digoxin 0.25 mg/5 cc cups and a single such cup would be released from the cell 170 channel. All products would fall to the conveyor 180 where they would be transported and dropped onto the main conveyor 50 running perpendicular thereto. A preferred high rate dispenser 30 is manufactured by PEEM in Graz, Austria under the project name of "Picking system for tablets and syringes". However, other similar A-frame or equivalent devices may be used as well.

Referring now to FIGS. 1 and 4, the low rate dispenser 40 includes a housing 190 enclosing a vertically rotating carousel 200 including a number of shelves 205, and a monitor 210 to display messages from the controller 12. A signal from the controller 12 directs the low rate dispenser 40 to position the shelf 205 containing the desired medication package in front of the operator. The signal also displays a message on the monitor 210 notifying the operator of how many packages of the medication to pick from the shelf 205. The operator picks the correct number of packages and places them on a conveyor 220 that runs from the low rate dispenser 40 to the conveyor 50 and eventually to the diverter 60. A preferred low rate dispenser 40 is manufactured by Remstar under the trade name Vertical Carousel and is distributed by Nelson Equipment out of Shreveport, La. However, other similar carousel devices may used as well.

FIG. 5 shows a partial pictorial schematic view of the conveyor 50 viewed in the direction of the arrow 230 shown in FIG. 1. The conveyor 50 includes a series of four continuous running conveyors 232, 234, 236, and 238 that transport medication products from the dispensers 20, 30, and 40 to the diverter 60. A signal from the controller 12 activates a plate 240 (shown in two different positions in phantom) in the diverter 60 that is pivotable through an angle θ as shown. Based on the angle θ, products are diverted to either the bagger 70 or to a ramp 250 leading to the storage bin 85 for manual processing. A preferred conveyor 50 is the Dorner system offered by Nelson Equipment Co. of Shreveport, La., though other similar conveyors may be used. A preferred diverter 60 is manufactured by Allied Instruments, Houston, Tex., though other similar diverters may be used.

Still referring to FIG. 5, the bagger 70 receives dosage packages from the conveyor 50 and places them in plastic bags that are typically cut from bulk bag stock. Other containers are possible, such as, paper bags, boxes or similar packaging. The bagger 70 includes a labeler that is capable of printing a human readable and a bar code label on one side of the plastic bags. The label will typically contain patient specific information as well as patient location, medication name and strength. If the controller 12 directs the products to the bagger 70, a signal is sent from the controller 12 to the bagger 70 to print the aforementioned label. The bagger 70 operates by spreading a plastic bag apart via a separator to allow drug products to be deposited inside. Heated jaws then seal and release the bag from the bagging stock into a collecting bin 80. Once sealed, the bags can be delivered to patient care areas. A preferred bagger 70 is manufactured by Batching Systems, Inc. in Owings, Md., under the trade name Bagmaster, Series C. However, other similar baggers may be used as well.

If manual bagging and labeling is desired, the controller 12 directs the products to the storage bin 85. In this case, the individual packages slide down a ramp 260 to the bin 85. A printer (not shown) receives a signal from the controller 12 to print a label that is affixed to a preformed bag. Drugs from the bin 85 are then placed in the bag by an operator.

In another embodiment of the present invention, an automated checking mechanism or scanner 90, such as a bar code reader or similar scanner, may be strategically placed along the conveyor to allow scanning of products before they are sent to the diverter 60. The scanner 90 scans the passing products for a particular parameter, such as a bar code or physical shape. The data from the scanner 90 is then compared by the controller 12 against the order received and processed by the controller 12. If the scanned parameter matches the patient order, the medication is allowed to continue to the bagger 70. However, if there is a mismatch, the products can be diverted away from the bagger 70 for manual processing.

The skilled artisan will appreciate that there are many variations which can be used with the system in the present invention. For example, in an alternative system 10' shown in FIG. 6, the conveyor 50 may be replaced with a series of chutes 280 that feed dosage units from any one of the dispensers 20, 30 or 40 to an upwardly inclined diverter 60'. A pivotable plate 240' and a divider 290 in the diverter 60' direct the dosage units to either the bagger 70 or the bin 85 as desired. This would require positioning the dispensers 20, 30, and 40 at elevations higher than the diverter 60' and the bagger 70.

In another variation of the system 10, the two dispensers, one medium rate and one high rate, may be replaced with several high rate dispensers. In another alternative, the medium rate dispenser 20 may used to deliver all the medication units. The skilled artisan will appreciate that the particular configuration of the system 10 may vary greatly depending on the needs of the particular health care facility.

As discussed above, the process of receiving prescription or medication order information with the use of the present invention, may be performed by having a terminal on each floor of the care facility, clinic or office so that once a doctor has seen a patient, that doctor can automatically change the prescription or medication order for that patient. Depending on whether the prescription requires review by a pharmacist, the prescription or medication order may be immediately transmitted to the controller 12 by hard-wire, modem, or other means and stored in a database contained in the controller 12. This assures that the processing of the prescription or medication order is most up-to-date with what is being prescribed. This method of order generation and communication greatly improves the interpretation of the order so that errors caused by illegible handwriting, misplaced decimal points and misspelled names are minimized.

As will be appreciated by those skilled in the art, the system 10 offers significant cost savings and efficiencies to care facilities which dispense numerous individual dosages of medication each day. The system 10 not only provides speed and efficiency in dispensing vast amounts of medications in individual doses to numerous patients in one or more care facilities but also reduces at least certain elements of human error normally in existence with a conventional manual picking, packaging and labeling process.

While the invention may be susceptible to various modifications and alternative forms, specific embodiments have been shown by way of example in the drawings. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. An apparatus for distributing individual dosage units of medication into containers, comprising:

a first dispenser having a first plurality of shelves for holding the individual dosage units of medication, and a robotic picking unit having at least two-axis movement for selectively picking one of the individual dosage units of medication off of one of the first plurality of shelves and dropping the picked individual dosage unit of medication;

a second dispenser having an A-frame, a plurality of storage cells coupled to the A-frame for holding the individual dosage units of medication, each of the plurality of storage cells being motorized and operable to individually dispense the individual dosage units of medication, a dedicated controller unit coupled to the A-frame for controlling the operation of the plurality of storage cells, and a first conveyor for receiving the dispensed individual dosage units of medication, the second dispenser being operable to dispense the individual dosage units of medication at a faster rate than the first dispenser;

a second conveyor for conveying the individual dosage units of medication dropped by the first dispenser and conveyed by the first conveyor;

a bagger being operable to receive the individual dosage units of medication from the second conveyor and to selectively place the individual dosage units of medication into the containers; and a programmable controller electrically coupled to the first and second dispensers, the bagger, and the dedicated controller and being operable to direct the first and second dispensers to dispense the individual dosage units of medication and to direct the bagger to place the individual dosage units of medication into the containers.

2. The apparatus of claim 1, comprising a third dispenser having housing, a vertically rotating carousel disposed in the housing and having a second plurality of shelves for holding the individual dosage units of medication, and a third conveyor for conveying individual dosage units of medication removed from the second plurality of shelves to the second conveyor, the third dispenser being operable to dispense the individual dosage units of medication at a slower rate than the first dispenser.

3. The apparatus of claim 1, wherein the programmable controller comprises a personal computer.

4. The apparatus of claim 1, comprising a storage bin to receive the individual dosage units of medication from the first and second dispensers, and a diverter electrically coupled to the programmable controller and being operable to selectively divert the individual dosage units of medication to either the bagger for automated packaging into the containers or to the storage bin for manual packaging into the containers.

5. The apparatus of claim 1, comprising a bar code scanner being operable to scan the individual dosage units of medication for a preselected parameter and send the results of the scan to the programmable controller.

6. An apparatus for distributing individual dosage units of medication into containers, comprising:

a first dispenser having a first plurality of shelves for holding the individual dosage units of medication, and a robotic picking unit having at least two-axis movement for selectively picking one of the individual dosage units of medication off of one of the first plurality of shelves and dropping the picked individual dosage unit of medication;

a second dispenser having an A-frame, a plurality of storage cells coupled to the A-frame for holding the individual dosage units of medication, each of the plurality of storage cells being motorized and operable to individually dispense the individual dosage units of medication, a dedicated controller unit coupled to the A-frame for controlling the operation of the plurality of storage cells, and a first conveyor for receiving the dispensed individual dosage units of medication, the second dispenser being operable to dispense the individual dosage units of medication at a faster rate than the first dispenser;

a second conveyor for conveying the individual dosage units of medication dropped by the first dispenser and conveyed by the first conveyor, the second conveyor having third, fourth, fifth, and sixth continuous running conveyors;

a bagger being operable to receive the individual dosage units of medication from the second conveyor and to selectively place the individual dosage units of medication into the containers;

a storage bin to receive the individual dosage units of medication from the second conveyor;

a diverter having a pivotable plate to selectively divert the individual dosage units of medication to either the bagger or the storage bin; and a personal computer electrically coupled to the first and second dispensers, the bagger, the dedicated controller, and the diverter, and being operable to direct the first and second dispensers to dispense the individual dosage units of medication, the diverter to divert the individual dosage units of medication to either the storage bin or the bagger, and to direct the bagger to place the individual dosage units of medication into the containers.

7. The apparatus of claim 6, comprising a third dispenser having housing, a vertically rotating carousel disposed in the housing and having a second plurality of shelves for holding the individual dosage units of medication, and a seventh conveyor for conveying individual dosage units of medication removed from the second plurality of shelves to the second conveyor, the third dispenser being operable to dispense the individual dosage units of medication at a slower rate than the first dispenser.

* * * * *